United States Patent [19]

Book

[11] Patent Number: 5,711,021
[45] Date of Patent: Jan. 20, 1998

[54] METHOD FOR GRAPHICALLY DISPLAYING VEHICLE TEST DATA

[75] Inventor: Jeffrey J. Book, Streamwood, Ill.

[73] Assignee: Snap-on Technologies, Inc., Lincolnshire, Ill.

[21] Appl. No.: 511,888

[22] Filed: Aug. 7, 1995

[51] Int. Cl.⁶ .......................... G01M 15/00; F02B 27/04
[52] U.S. Cl. ........................ 701/33; 73/23.31; 364/497
[58] Field of Search .................. 364/424.034, 424.038, 364/497, 498; 73/23.31, 23.32, 117.2, 117.3

[56] References Cited

U.S. PATENT DOCUMENTS

| | | | |
|---|---|---|---|
| 3,948,231 | 4/1976 | Smith | 123/103 R |
| 4,171,637 | 10/1979 | Blanke | 73/118 |
| 4,328,546 | 5/1982 | Kreft et al. | 364/424 |
| 4,399,407 | 8/1983 | Kling et al. | 324/379 |
| 4,418,566 | 12/1983 | Beck et al. | 73/23 |
| 4,476,531 | 10/1984 | Marino et al. | 364/431.01 |
| 4,727,746 | 3/1988 | Mikasa et al. | 73/23 |
| 4,811,250 | 3/1989 | Steber et al. | 364/551 |
| 5,034,893 | 7/1991 | Fisher | 364/431.01 |
| 5,099,680 | 3/1992 | Fournier et al. | 73/23.31 |
| 5,105,651 | 4/1992 | Gutmann | 73/23.31 |
| 5,210,702 | 5/1993 | Bishop et al. | 364/496 |
| 5,272,769 | 12/1993 | Stmatka et al. | 395/161 |
| 5,310,474 | 5/1994 | Hetrick et al. | 204/425 |
| 5,572,424 | 11/1996 | Kellogg et al. | 364/424.03 |
| 5,585,552 | 12/1996 | Heuston et al. | 73/116 |

*Primary Examiner*—Michael Zanelli
*Attorney, Agent, or Firm*—Emrich & Dithmar

[57] ABSTRACT

A method and apparatus is provided for graphically displaying gas emission levels of certain selected ingredients of an exhaust gas collected by an engine analyzer system during a 240-second emission test. The emission levels are variable with the speed of the vehicle under test. The graphic display may further include a waveform showing the maximum allowable gas concentration levels of a selected ingredient gas. Additionally, where a number of tests have been taken, the first, previous and last concentration level waveforms may be simultaneously displayed (using different line hashings or colors) for communicating comparison information to the technician. Finally, the technician may selectively display, in graphical form, a speed-correlation waveform (actual or ideal). Speed and gas emission levels are displayed on appropriate y-axes located on opposite sides of the graph. Additionally, all waveforms are auto-scaled to facilitate ease of reading.

20 Claims, 2 Drawing Sheets

METHOD FOR GRAPHICALLY DISPLAYING VEHICLE TEST DATA

BACKGROUND OF THE INVENTION

1. Field of the Invention

The present invention relates to a method for displaying vehicle test data to aid an engine analyzer operator to quickly interpret vehicle emissions data.

2. Description of the Prior Art

Many countries require the certification of motor vehicles, especially with respect to engine emissions. Typically, such a test involves connecting a vehicle to a dynamometer while an automotive technician accelerates and decelerates the non-moving vehicle over a 240-second interval to simulate normal driving conditions. As time progresses and as engine speed is varied, the engine analyzer monitors and collects data on the emission output levels of the vehicle. The collected emission data may include the amount of HC, CO, $CO_2$, NO, $O_2$, or other emission constituents, as well as information on speed of the vehicle, during predefined data-recording intervals of the test. The data is interpreted and test results presented to the operator in the form of text-only, summary data reports and/or tables.

An automotive technician relies on those results to determine whether the vehicle emission levels meet EPA standards. In the event the vehicle fails the emissions test, the results of the test are useful in diagnosing the vehicle emission system components to isolate and correct the problem. Since emission tests are generally conducted over a 240-second time interval and usually over varying driving conditions, determining which speed emission output levels are outside allowable limits is difficult, if not impossible, with text-only reports.

The technician uses the test results to fault isolate the faulty component, or components, which are causing the vehicle's emission output levels to exceed allowable limits. Once a component is replaced, the emissions test is typically repeated. In the event the vehicle continues to fail the test, the technician might want to compare the results of the previous test or tests to the most recently performed test as a way to better fault isolate the problem. Presently, the technician must manually flip through computer-generated printouts of previous-test data to do this.

SUMMARY OF THE INVENTION

It is a general object of the invention to provide a method and apparatus for graphically displaying test data collected during a 240-second interval emissions test.

It is another object of the present invention to provide a method and apparatus for simultaneously, graphically displaying test data collected during multiple such emission tests.

It is yet another object of the present invention to graphically display measured gas emission levels, such as gas concentration levels, of certain selected ingredients of an exhaust gas during the 240-second interval, which concentration levels are variable with the speed of the vehicle under test. The graphic display may further include a waveform showing the maximum allowable gas concentration levels of a selected ingredient gas.

Additionally, where a number of tests have been taken, the first, previous and last concentration level waveforms may be simultaneously displayed (using different line hashings or colors) for communicating comparison information to the technician. This is useful in the situation where the technician is attempting to correct or diagnose an emission system problem.

Finally, the technician may selectively display, in graphical form, a speed-correlation waveform (actual or ideal). This waveform, when superimposed with one or more of the gas concentration waveforms, provides an immediate indication to the technician of the relative speed of the vehicle at any point in time, and particularly when the gas concentration levels fail to meet specs. In the preferred embodiment, speed and concentration levels are displayed on appropriate y-axes located on opposite sides of the graph. Additionally, all waveforms are auto-scaled to facilitate ease of reading.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
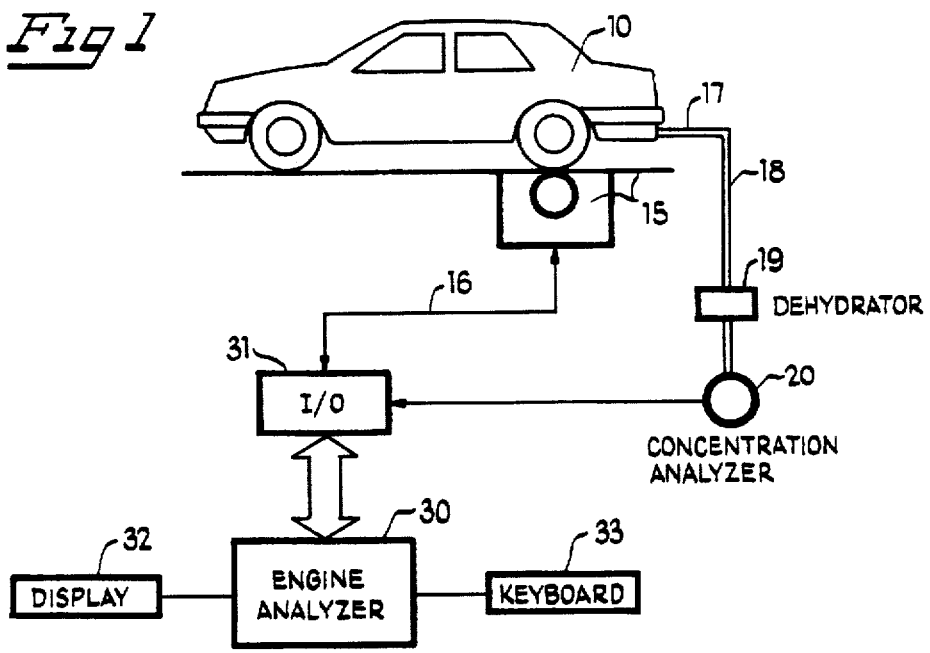
FIG. 1 is a diagrammatic illustration of a vehicle emission test system, including an engine analyzer coupled to a dynamometer for collecting vehicle speed readings and emission output levels during a 240-second emissions test.

Referring to FIG. 1, there is illustrated a vehicle emissions test system for use on a motor vehicle 10, coupled in a known manner to a chassis dynamometer 15 which is operable to simulate various driving conditions of the engine of the motor vehicle 10, as if it were being driven on an actual road. The engine of the vehicle 10 is controlled by a driver seated in the vehicle who will variably accelerate, decelerate and maintain cruising speeds, in an appointed sequence over a predefined and continuous driving period (usually a 240-second test period). During this driving period, the dynamometer 15 permits the vehicle wheels to be rotated in engagement with a surface while the vehicle is standing still, permitting the test to be conducted in a technician's shop.

The dynamometer 15 relates information of the vehicle's actual wheel (driving) speed to an engine analyzer 30 via communication link 16. The engine analyzer 30 is equipped with an I/O port 31, an appropriate monitor display 32 and may also include additional peripheral resources (not shown), such as printers and external memory, coupled thereto. Operator input commands and test parameters, such as will be explained below, are fed to the analyzer 30 via a keyboard 33 and stored in appropriate memory registers.

Reference numeral 17 designates an exhaust-gas-inlet passage for receiving gas exhausted from the vehicle 10 under test. During a typical emissions test, gas samples are led from the exhaust gas-inlet passage 17 through a sampling passage 18 for measurement of the concentration of each of various ingredient gases (e.g., HC, CO, $CO_2$, NO, and $O_2$). For this purpose, a dehydrator 19 is provided for dehydrating the exhaust gas at a specified temperature, the output thereof being fed to a concentration analyzer 20 which analyzes the exhaust gas to determine the concentration of each of one or more specified ingredient gases (the ingredient or ingredients to be measured). The measured ingredient gas concentration levels are then communicated to the engine analyzer 30 from the concentration analyzer 20, via the I/O port 31, and stored in assigned memory locations, all in a known manner.

The engine analyzer 30 takes data readings and performs necessary background test-related calculations over a 240-second simulated driving period at successive one-second, sampling time intervals, in accordance with current EPA emissions testing requirements. EPA rules presently require that all measurements be taken over a varying range of driving modes, such as acceleration, cruise and deceleration modes. In order to maintain the vehicle speed within a varying allowable range during the test period, the technician may be aided by a 240-second time-based recommended drive trace generated on the screen of display 32 in a known manner. A time-based trace of the vehicle's actual speed may be simultaneously superimposed over the recommended drive trace to aid the technician in maintaining the vehicle speed within time-varying allowable vehicle speeds.

The engine analyzer 30 is essentially a microprocessor-based embedded controller system adapted to carry out multiple system functions, including controlling the operation of the dynamometer 15 in a conventional manner by way of the communication link 16 thereto, and storing detected vehicle speed information and gas concentration levels for each of the predetermined successive intervals during the period the vehicle 10 is under test. The analyzer 30 also generates the drive-trace display which aids the technician in appropriately varying the vehicle's speed, and stores the actual speed drive trace over the 240-second interval test in memory.

When multiple emission tests are performed on the same vehicle, the analyzer 30 records the results of each test. The results are then graphically presented to a technician in the manner to be described below.

Figure 2:
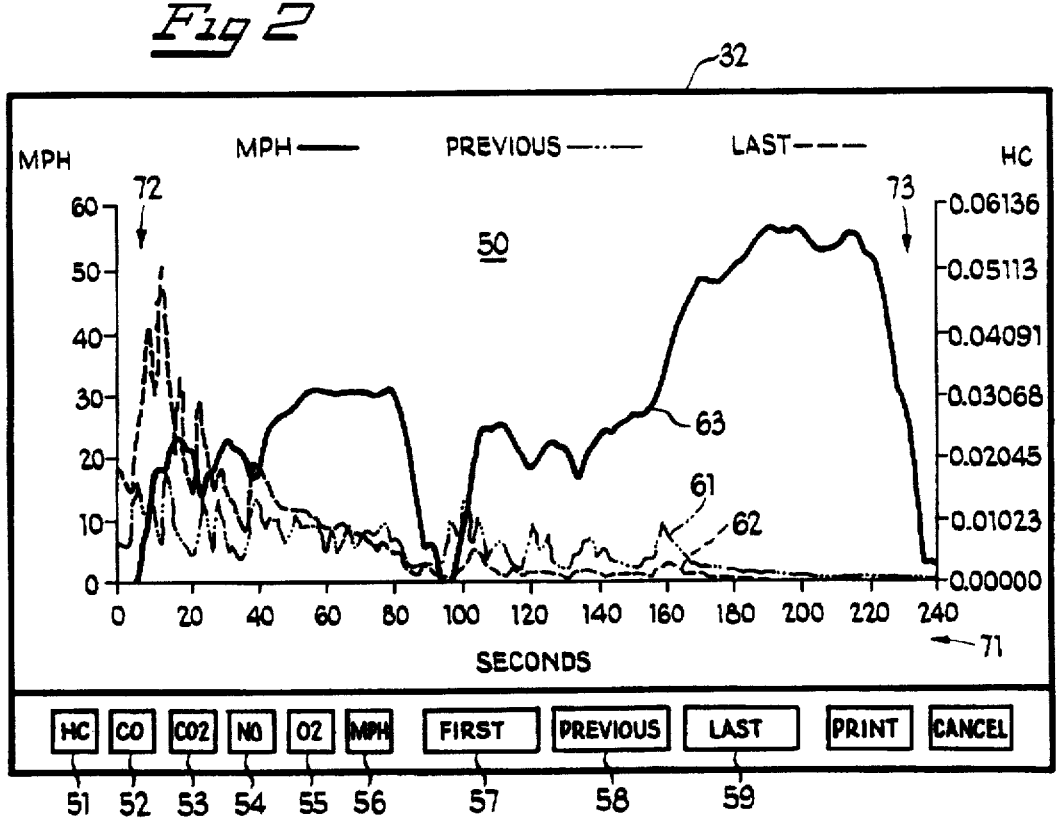
FIG. 2 is a full-screen graph of result data from a previously tested vehicle.

Referring to FIG. 2, there is shown a full-screen graph 50 of result data recorded by the analyzer 30 during each of multiple emission tests. The technician selects the waveform (s) he or she wants displayed on the monitor screen 32 by pressing the corresponding soft keys 51–59 underneath the graphical portion of the screen 32. Soft keys 51–55 respectively select an associated one of an HC, CO, $CO_2$, NO, or $O_2$ ingredient-gas waveform during a "first" emission test (soft key 57), a "previous" emission test (soft key 58) and/or a "last" emission test (soft key 59). When soft key 56 is pressed, the analyzer 30 additionally displays an ideal drive-trace line 63 indicative of the recommended, varying speed of the vehicle at appointed time intervals during the 240-second emission test period.

Turning now to FIG. 2, there is shown two superimposed time-based waveforms 61, 62, the data for which is derived from HC-based concentration-levels respectively measured during each of a "previous" emission test and a "last" emission test.

A drive-trace line 63 is also shown superimposed over the waveforms 61, 62. The horizontal x-axis (71) of the graph 50 is labeled to Show a time-varying dependence with the displayed waveforms 61, 62, 63, with the units of measurement being in seconds (t=0 to t=240). Similarly, two vertical axes 72, 73, are provided, respectively drawn on the left side and on the right side of graph 50. Axis 72 shows a speed-based dependence associated with the drive-trace line 63—the units of measurement being in MPH (or KPH). Axis 73 shows a gas output level dependency with respect to HC waveforms 61, 62.

The displayed vertical axes and corresponding waveforms are automatically scaled by the analyzer 30 prior to display to maximize the sizing of the respective waveforms, thus making them easy to read. Toward this end, the respective waveform lines also may be distinctively colored for better visual clarity. Optionally, it would also be possible to resize and/or relocate the graph 50 in a different portion of the screen 32 to allow for textual or other graphic information to be simultaneously displayed.

It should also be appreciated that with minimal code changes to the soft key template, additional features could be introduced for display on the graph 50. For example, the technician may wish to display a maximum allowable gas-concentration-level-indicating waveform, superimposed over the measured waveform(s), for a selected ingredient gas. Such a waveform graphically communicates to the technician whether allowable gas emission levels were exceeded, and if so, (a) whether exceeded during the "first", "previous", or "last" test; (b) at which portion of the 240-second test; and (c) at what speed (in MPH or KPH) or at what driving conditions (cruise, acceleration, or deceleration mode).

Alternatively, the technician may also wish to display a waveform of the actual rather than ideal vehicle speed drive trace.

Optionally, the technician could further elect to have displayed only a portion of the graph 50, zoomed to a specified time interval window (e.g., from t=0 to t=60).

Figure 3A:
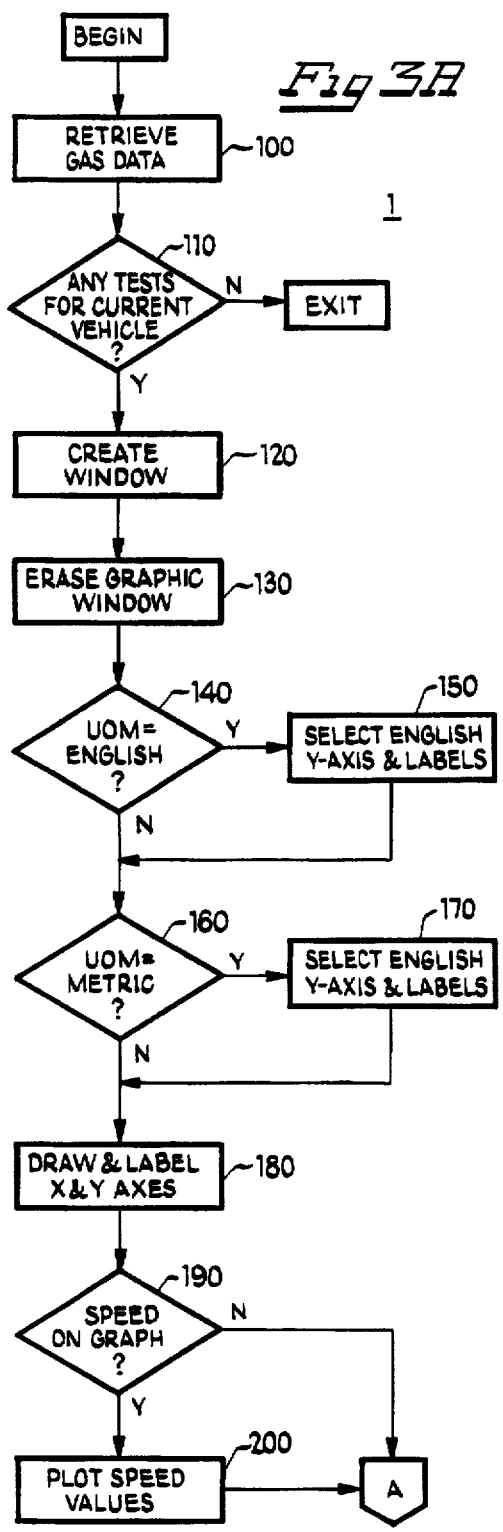
FIGS. 3A and 3B show an operational flow chart of the method of generating the graph of FIG. 2.
Figure 3B:
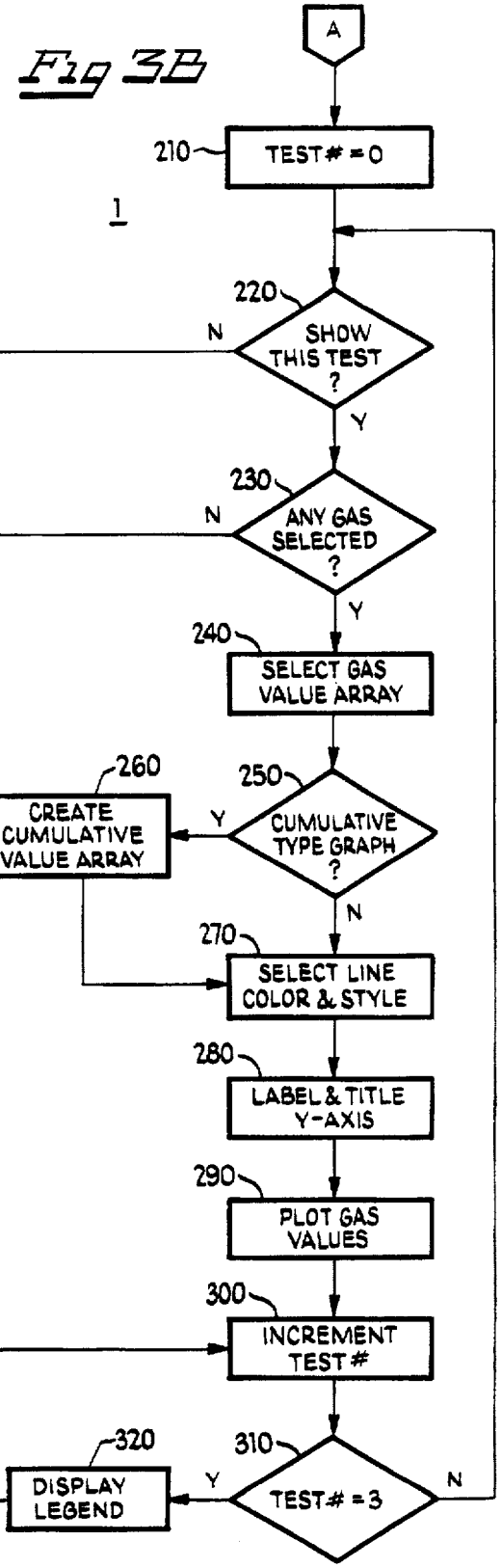

The operational flow chart of the method of graphically displaying emission data, as in FIG. 2, will now be generally described with reference to FIGS. 3A and 3B.

The generation of graph 50 is initiated by a technician immediately following the completion of one or more emission tests conducted in the manner explained above, using emission data retrieved from appropriate locations in the engine analyzer 30 memory (block 100). The graph generation routine 1 of FIGS. 3A, 3B initially determines, as at 110, whether previous tests have been performed for the vehicle under test, the results of which would have been stored by the analyzer 30. If so, a window is generated on the screen 32 (120) including soft keys 51–59 shown in FIG. 2. Any existing graphical images are then erased (130) and the units of measurement displayed in English (140, 150) or in metric form (160, 170) according to predetermined parameters. The appropriate labels along the vertical y-axes are then selected and drawn together with the X-axis label (180). The status of MPH soft key 56 is then quizzed, at 190, and, if pressed, the drive-trace is plotted (200).

The status of the "first" test soft key 57 is then quizzed, (test #=0) at 210–220, and, if pressed, the ingredient gas soft keys 51–55 are quizzed, at 230, to determine the gas or gases for which waveforms are to be generated. Associated gas value arrays for the selected ingredient gas(es) are then retrieved 240 and calculations (250, 260) performed to generate the corresponding gas plot values. Appropriate line hashings and/or colors (270) are then automatically selected for each respective waveform to be generated. Finally, the corresponding labels and title of all the vertical axes (280)

are added to the graph 50 and the waveforms plotted (290) to complete the graphing of those waveforms associated with the "first" test (test#=0).

In a similar manner, the gas waveforms associated with the "previous" test (test#=1), and the "last" test (test#=2) are generated and superimposed over any previously generated waveforms. After all the waveforms are plotted (310), appropriate graph text and/or legends (320) are created, completing the graph 50 (330).

It should be understood that the circuitry for displaying the graphical interface of screen 32 is well known in the art of video image processing and forms no part of the present invention. The screen 32 may be any conventional cathode-ray-tube (CRT) display device or any equivalent thereof having a sufficiently high pixel resolution to provide crisp, easy-to-read graphical images.

Furthermore, in the preferred embodiment, the code for performing the various display and graphing functions is written in C-language, but another similar high-level language may have been used instead. The zooming, auto-scaling, graphing of collected data, and the related features described above are easily carried out using the library of graphical interface software tools commercially available with C-language.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered byway of illustration only and not as a limitation. The actual scope of the invention is intended to be defined in the following claims when viewed in their proper perspective based on the prior art.

I claim:

1. A method of automatically graphically displaying, on a display screen, emission test data collected and stored by an engine analyzer, the method comprising the engine analyzer performed steps of:
   generating and displaying on the screen at least one time-based first waveform representative of gas emission output levels of at least one selected ingredient gas, which levels are collected, measured and stored by the analyzer during a first emission test; and
   generating and displaying on the screen, superimposed over said at least one first waveform, at least one second time-based waveform representative of gas emission output levels of said at least one selected ingredient gas, which levels are collected by the analyzer during a second emission test.

2. The method of claim 1, wherein said at least one first and second waveforms are equal to one first waveform and one second waveform, both being with respect to the same ingredient gas.

3. The method of claim 1, further comprising the step of displaying independent vertical axes, appropriately labeled, respectively for the different selected ingredient gas waveforms.

4. The method of claim 1, wherein said displayed waveforms are auto-scaled for optimal visual clarity.

5. The method of claim 1, wherein said displayed waveforms are differently colored for visual clarity.

6. The method of claim 1, wherein said displayed waveforms are provided with different line styles for visual clarity.

7. The method of claim 1, further comprising the step of superimposing on the screen a third waveform showing a maximum allowable gas concentration level of a selected ingredient gas.

8. A method of automatically graphically displaying, on a display screen, emission test data collected and stored by an engine analyzer, the method comprising the engine analyzer performed steps of:
   generating and displaying on the screen at least one time-based first waveform representative of gas emission output levels of at least one selected ingredient gas, which levels are collected, measured and stored by the analyzer during a first emission test; and
   generating and displaying on the screen, superimposed over said at least one first waveform, a speed-correlation drive-trace waveform representative of one of an actual and an ideal drive trace of the relative speed of the vehicle at appointed time intervals during the first emission test.

9. The method of claim 8, further comprising the step of displaying independent vertical axes, appropriately labeled, respectively for different selected ingredient gas waveforms and for said speed-correlation waveform.

10. The method of claim 8, wherein said displayed waveforms are auto-scaled for optimal visual clarity.

11. The method of claim 8, wherein said displayed waveforms are differently colored for visual clarity.

12. The method of claim 8, wherein said displayed waveforms are provided with different line styles for visual clarity.

13. The method of claim 8, further comprising the step of superimposing a waveform showing a maximum allowable gas concentration level of a selected ingredient gas.

14. The method of claim 8, further comprising the step of displaying on the screen, superimposed over said at least one first waveform and said speed-correlation waveform, at least one second time-based waveform representative of gas emission output levels of said at least one selected ingredient gas, which levels are collected by the analyzer during a second emission test.

15. The method of claim 14, further comprising the step of displaying independent vertical axes, appropriately labeled, respectively for each different selected ingredient gas waveform and for said speed-correlation waveform.

16. The method of claim 14, wherein said displayed waveforms are auto-scaled for optimal visual clarity.

17. The method of claim 14, wherein said displayed waveforms are provided with different line styles for visual clarity.

18. The method of claim 14, further comprising the step of superimposing a waveform showing a maximum allowable gas concentration level of a selected ingredient gas.

19. An apparatus for automatically graphically displaying vehicle emission related data on an engine analyzer display screen, comprising:
   means for generating and displaying on the screen at least one time-based first waveform representative of gas emission output levels of at least one selected ingredient gas, which levels are collected, measured and stored by the analyzer during a first emission test; and
   means for generating and displaying on the screen, superimposed over said at least one first waveform, a speed-correlation drive-trace waveform representative of one of an actual and an ideal drive trace of the relative speed of the vehicle at appointed time intervals during the first emission test.

20. The apparatus of claim 19, further comprising means for displaying on the screen, superimposed over said at least one first waveform and said speed-correlation waveform, at least one second time-based waveform representative of gas emission output levels of said at least one selected ingredient gas, which levels are collected by the analyzer during a second emission test.

* * * * *